United States Patent
Pramik

(10) Patent No.: US 7,457,193 B2
(45) Date of Patent: Nov. 25, 2008

(54) SEISMIC SOURCE AND SOURCE ARRAY HAVING DEPTH-CONTROL AND STEERING CAPABILITY

(75) Inventor: William B. Pramik, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/490,929

(22) Filed: Jul. 21, 2006

(65) Prior Publication Data
US 2008/0019214 A1  Jan. 24, 2008

(51) Int. Cl.
*G01V 1/38* (2006.01)
(52) U.S. Cl. .................. 367/16; 367/142; 181/110
(58) Field of Classification Search ........... 367/16–17, 367/115, 142; 181/110
See application file for complete search history.

(56) References Cited

U.S. PATENT DOCUMENTS

| | | | | | |
|---|---|---|---|---|---|
| 3,611,975 | A | * | 10/1971 | Ashbrook | 114/245 |
| 3,618,555 | A | * | 11/1971 | Kelly et al. | 114/244 |
| 3,648,642 | A | * | 3/1972 | Fetrow et al. | 114/245 |
| 3,673,556 | A | * | 6/1972 | Biggs | 367/18 |
| 3,774,570 | A | * | 11/1973 | Pearson | 114/245 |
| 3,943,483 | A | * | 3/1976 | Strange | 367/17 |
| 3,961,303 | A | * | 6/1976 | Paitson | 367/17 |
| 4,027,616 | A | * | 6/1977 | Guenther et al. | 114/244 |
| 4,033,278 | A | * | 7/1977 | Waters | 114/245 |
| 4,038,630 | A | | 7/1977 | Chelminski | |
| 4,064,479 | A | | 12/1977 | Ruehle | |
| 4,222,340 | A | * | 9/1980 | Cole | 114/245 |
| 4,290,124 | A | * | 9/1981 | Cole | 367/18 |
| 4,350,111 | A | * | 9/1982 | Boyce, II | 114/245 |
| 4,382,486 | A | | 5/1983 | Ruehle | |
| 4,404,664 | A | * | 9/1983 | Zachariadis | 367/19 |
| 4,625,302 | A | * | 11/1986 | Clark | 367/24 |
| 4,709,355 | A | * | 11/1987 | Woods et al. | 367/16 |
| 4,729,333 | A | * | 3/1988 | Kirby et al. | 114/244 |
| 4,890,568 | A | * | 1/1990 | Dolengowski | 114/246 |
| 4,928,262 | A | * | 5/1990 | Neeley et al. | 367/106 |
| 4,974,213 | A | * | 11/1990 | Siwecki | 367/88 |

(Continued)

FOREIGN PATENT DOCUMENTS

EP   0 884 607   12/1998

(Continued)

OTHER PUBLICATIONS

Verd, G.; Hunsaker, G., "Dolphin—Flexibility for submarine research and development," Oceans, vol. 9, No., pp. 53-57, Sep. 1977. URL: http://ieeexplore.ieee.org/iel6/8271/25911/01154354.pdf?.*

(Continued)

*Primary Examiner*—Jack W Keith
*Assistant Examiner*—Ari M Diacou
(74) *Attorney, Agent, or Firm*—E. Eugene Thigpen; Richard A. Fagin

(57) ABSTRACT

A marine seismic energy source includes a seismic tow cable configured to be towed by a vessel from one end and at least one seismic source coupled proximate another end of the tow cable. The at least one seismic source is associated with a depth controller. The depth controller is configured to move the seismic source to a selectable depth in a body of water.

3 Claims, 4 Drawing Sheets

U.S. PATENT DOCUMENTS

| | | | | |
|---|---|---|---|---|
| 5,357,892 | A | * | 10/1994 | Vatne et al. ................. 114/244 |
| 5,404,339 | A | * | 4/1995 | Cole, Jr. ...................... 367/16 |
| 5,532,975 | A | * | 7/1996 | Elholm ........................ 367/16 |
| 6,002,648 | A | * | 12/1999 | Ambs ......................... 367/159 |
| 6,019,652 | A | * | 2/2000 | Nielsen et al. .............. 441/133 |
| 6,111,817 | A | * | 8/2000 | Teeter ......................... 367/13 |
| 6,230,840 | B1 | * | 5/2001 | Ambs ......................... 181/113 |
| 6,459,653 | B1 | * | 10/2002 | Kuche ......................... 367/17 |
| 6,755,144 | B1 | * | 6/2004 | Hocquet et al. ............. 114/242 |
| 7,047,898 | B2 | * | 5/2006 | Petersen et al. ............. 114/244 |
| 7,167,412 | B2 | * | 1/2007 | Tenghamn ................... 367/16 |
| 2006/0133199 | A1 | * | 6/2006 | Tenghamn ................... 367/17 |
| 2006/0133200 | A1 | * | 6/2006 | Tenghamn ................... 367/17 |
| 2006/0285434 | A1 | * | 12/2006 | Welker et al. ................. 367/19 |

FOREIGN PATENT DOCUMENTS

| | | |
|---|---|---|
| GB | 1 165 834 | 5/1967 |
| GB | 1 569 184 | 10/1976 |
| WO | WO 9828636 A1 * | 7/1998 |

OTHER PUBLICATIONS

Michael J. Grimble, Gernt M. van der Molen and Eduardo Liceaga-Castro. Submarine Depth and Pitch Control. Second IEEE Conference on Control Applications, Sep. 13-16, 1993 Vancouver, B.C. pp. 953-958. URL: http://ieeexplore.ieee.org/iel2/1046/8055/00348208.pdf?arnumber=348208.*

* cited by examiner

SEISMIC SOURCE AND SOURCE ARRAY HAVING DEPTH-CONTROL AND STEERING CAPABILITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More particularly, the invention relates to structures for a marine seismic energy source and an array of seismic energy sources.

2. Background Art

In marine seismic surveying, a seismic energy source is used to generate seismic energy in the form of acoustic pulses or waves in a body of water such a lake or the ocean. The seismic energy travels downwardly in the water, through the water bottom, and through the Earth formations underlying the water bottom. Part of the energy passing through the Earth formations underlying the water bottom is reflected upward from acoustic impedance boundaries in the Earth formations. The upwardly traveling seismic energy is detected by sensors such as hydrophones towed in one or more streamer cables disposed near the water surface, or by sensors disposed in cables along the water bottom. The sensors convert the detected energy to electrical or optical signals. The electrical or optical signals are then conditioned and interpreted to provide information both as to the composition and the structure of the various subsurface Earth formations. Such information is used particularly to determine the possibility that such Earth formations may contain mineral deposits such as hydrocarbons.

The most frequently used marine seismic energy source at present is known as an "air gun." In an air gun, a charge of compressed air or inert gas under high pressure, on the order of 2000-6000 pounds per square inch (130 to 400 bar), is supplied to a chamber within the gun. When the air gun is actuated or "fired", a valve rapidly opens to discharge the pressurized air or gas from the chamber into the water. The valve then closes and the chamber is repressurized with air or gas from a source such as a compressor. Such firing can be repeated as often as desired and within the capacity of the source to repressurize the chamber. The air or gas discharges in a bubble or plurality of such bubbles in the water.

A single air gun produces a seismic pulse having acoustic energy content with respect to frequency (the source "signature") related to a complex pressure interaction between the air bubbles and the water that causes the bubbles to oscillate as they float toward the water surface. Such interaction can produce extraneous bursts of seismic energy following the initial energy burst. The amplitude and periodicity of these bubble-generated extraneous bursts depend on, among other factors, the depth of the gun in the water and the size of the pressurized air chamber in the gun. It is therefore known in the art to use an array of air guns having various different chamber sizes, and to fire such guns contemporaneously or in a preselected timing sequence. Such firing of an array of air guns provides several advantages over firing a single air gun.

First, the total amount of energy being imparted into the Earth's subsurface for each seismic "shot" is increased. In addition, the different chamber sizes for the various guns will produce different bubble responses, causing the bubble responses to tend to cancel each other. The directivity of the energy source toward the water bottom can be improved, because in directions other than directly below the source array, some frequencies in the seismic energy will be attenuated by the spatial distribution of the guns in the array. Design considerations for enabling air gun arrays to attain certain spectral and directivity characteristics are disclosed in U.S. Pat. No. 4,064,479 issued to Ruehle, and in U.S. Pat. No. 4,382,486 issued to Ruehle, for example.

A typical air gun array is towed behind a seismic survey vessel or a source vessel using a structure suspended from a buoy or similar flotation device that can be towed in the water. The flotation device is typically coupled to a frame or similar substantially rigid structure so as to suspend the frame in the water. Individual air guns forming the array may be suspended from the frame by cables or chains. An example of a typical air gun array known in the art is shown in FIG. 1. A tow cable 10 is functionally coupled at one end to the towing vessel (not shown). Near the aft end of the tow cable 10, the tow cable 10 may be functionally coupled to a float 12. The float 12 is coupled to frame struts 14 that form a rigid framework for the tow cable 10. The tow cable 10 is shown in FIG. 1 as being substantially U-shaped at the aft end and held in such configuration by the struts 14. An air gun mounting frame 17 may be coupled to the tow cable 10 proximate a lower end of the struts 14. Air guns 22 are suspended from the mounting frame 17 by chains 24 or a similar fixed length device. Typically, the mounting frame 17 will include one or more depth sensors 18 and, proximate the positions where the air guns 22 are suspended, a hydrophone 20 or similar seismic sensor to measure the near field acoustic signature of each of the air guns.

In air gun arrays known in the art, individual air guns in the array are typically suspended at a substantially fixed depth in the water, which depends on the length of the struts 14 and the chains 24. However, it is desirable in some instances to be able to change the depth of one or more of the air guns during actual survey operations in order to fine tune the spectral content of the array, among other purposes. When using seismic source towing structures known in the art it is necessary to remove the towing structure from the water and change the length of a rope, cable, chain or other device that couples the source to the towing frame or structure. Such operation is time consuming, and does not provide for adjustment of the source depth during surveying operations. What is needed is a device to enable adjusting the depth of a seismic energy source during survey operations.

In some cases it may also be desirable to be able to move the lateral position of the seismic sources with respect to the towing vessel, among other purposes, to provide different illuminating angles of the seismic energy with respect to the subsurface Earth formations. Using source array structures known in the art, it is not possible to move the source lateral position during operation of the seismic source array.

SUMMARY OF THE INVENTION

One aspect of the invention is a marine seismic energy source. A marine seismic energy source according to this aspect of the invention includes a seismic tow cable configured to be towed by a vessel from one end and at least one seismic source coupled proximate another end of the tow cable. The at least one seismic source is associated with a depth controller. The depth controller is configured to move the seismic source to a selectable depth in a body of water.

In some embodiments, the source may be associated with a rudder configured to move the source to a selected lateral position behind a tow vessel.

A seismic energy source array according to another aspect of the invention includes a plurality of seismic energy sources coupled to a tow cable. A depth controller is associated with the seismic energy sources. The depth controller is configured to move the seismic energy sources to a selectable depth in a body of water.

Other aspects and advantages of the invention will be apparent from the following description and the appended claims.

DETAILED DESCRIPTION

Figure 1:
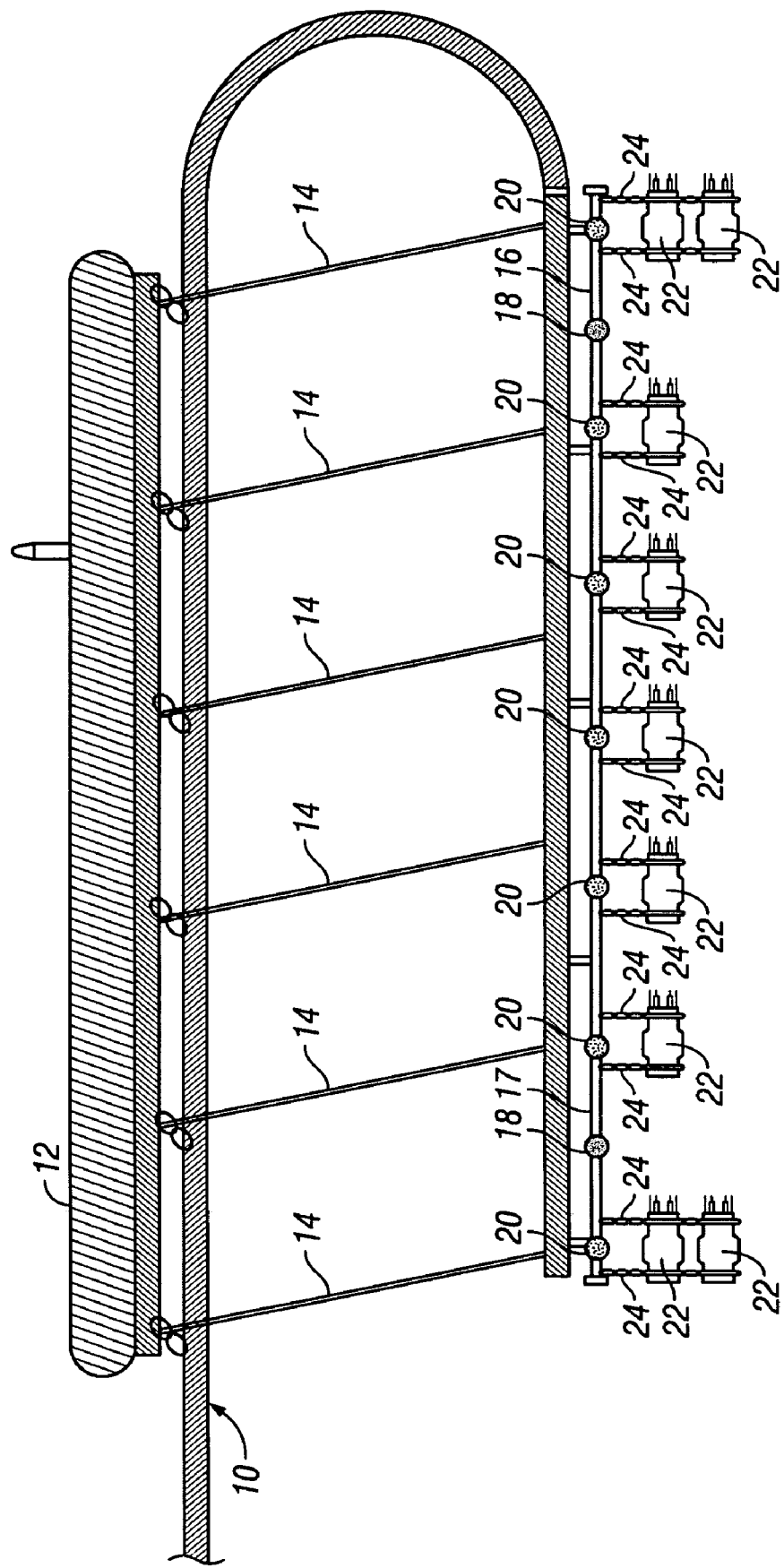
FIG. 1 is an example prior art seismic source array.
Figure 2:
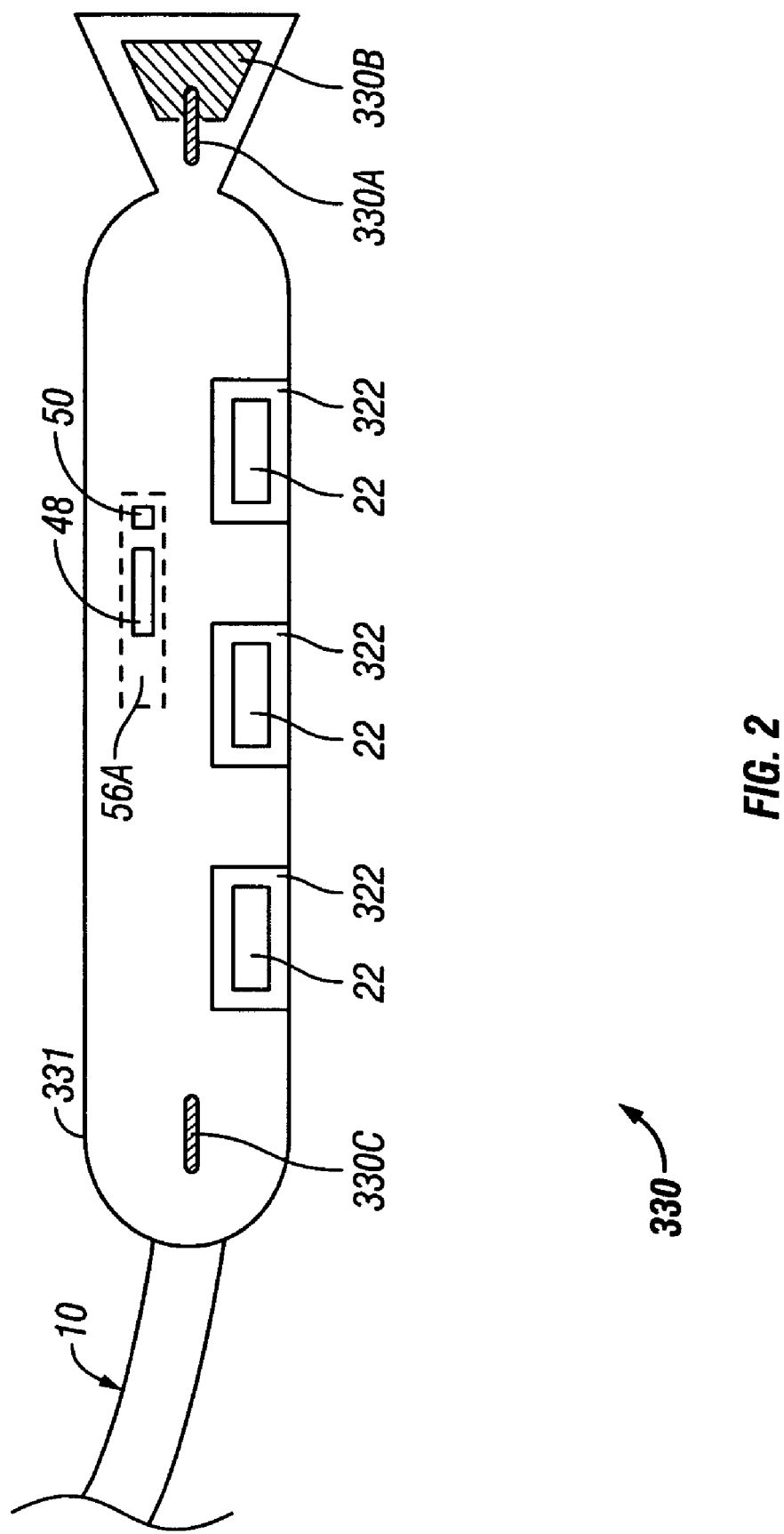
FIG. 2 shows an embodiment of a steerable and depth controllable seismic source array.

One embodiment of a seismic source array that can be operated at a selected depth in a body of water, such as a lake or the ocean, is shown schematically in FIG. 2. The seismic source array 330 includes a preferably hydrodynamically-shaped housing 331, which may be made from steel, aluminum or other high strength material, and is affixed generally at the aft end of a tow cable 10 towed by a seismic vessel (not shown) or other vessel in the body of water. The housing 331 may have a substantially cylindrical cross-section, may have a tapered or "torpedo-shaped" profile, or may be similarly shaped, and is preferably configured to move with relatively little drag through the water.

A seismic energy source 22, which can be an air gun, but may also be a water gun, gas combustion (detonation) gun or any other device known in the art for use as a marine seismic energy source can be disposed in any one or more of a plurality of respective recesses 322 in the housing 331. The recesses 322 are open on one side to the water and sealingly close off the interior of the housing 331 adjacent thereto. The space within the interior of the housing 331, other than in the recesses 322 and a sealed chamber 56A (explained further below) defined within the interior of the housing 331, may be filled with kerosene or a similar substantially incompressible liquid, a solid, lightweight material such as foamed styrene, or a suitable gas having density less than water. The material filling the interior of the housing 331 is included to provide suitable buoyancy to the housing 331, preferably approximately neutral buoyancy. The material can also provide resistance to crushing the housing 331 by reason of hydrostatic pressure of the water when the housing 331 is disposed at a considerable water depth.

The housing 331 may define therein one or more sealed, air-filled chambers 56A in which may be disposed a pressure sensor 50 (coupled at its sensing point to the external water pressure) and a system controller 48, configured as will be explained in more detail below with reference to FIG. 3. The system controller 48 may control operation of diving planes 330A, as will be explained with reference to FIG. 3. The system controller 48 may also be arranged to control operation of a rudder 330B mounted to the housing 331 rotatably about an axis substantially transverse to the rotation axis of the diving planes 330A. One embodiment of a suitable mechanism to operate the rudder 330B and/or the diving planes 330A will also be explained with reference to FIG. 3. Stabilization planes 330C may be affixed at locations along the housing 331 as is the one shown in FIG. 2, wherein a symmetrically placed stabilization plane is disposed on the other side of the housing 331 (and is therefore not visible in FIG. 2).

The diving planes 330A and rudder 330B may be operated, as will be explained in more detail below, to position the array 330 at a selected depth in the water and at a selected lateral position with respect to the towing vessel (not shown). Collectively, the housing 331 and diving planes 330A and associated operating mechanism may be referred to for convenience as a "depth controller" by reason of its capability to control the depth of the seismic sources 22 in the water. In embodiments that include a rudder 330B, such as shown in FIG. 2, the combination may be referred to as a "steerable" depth controller.

Figure 4:
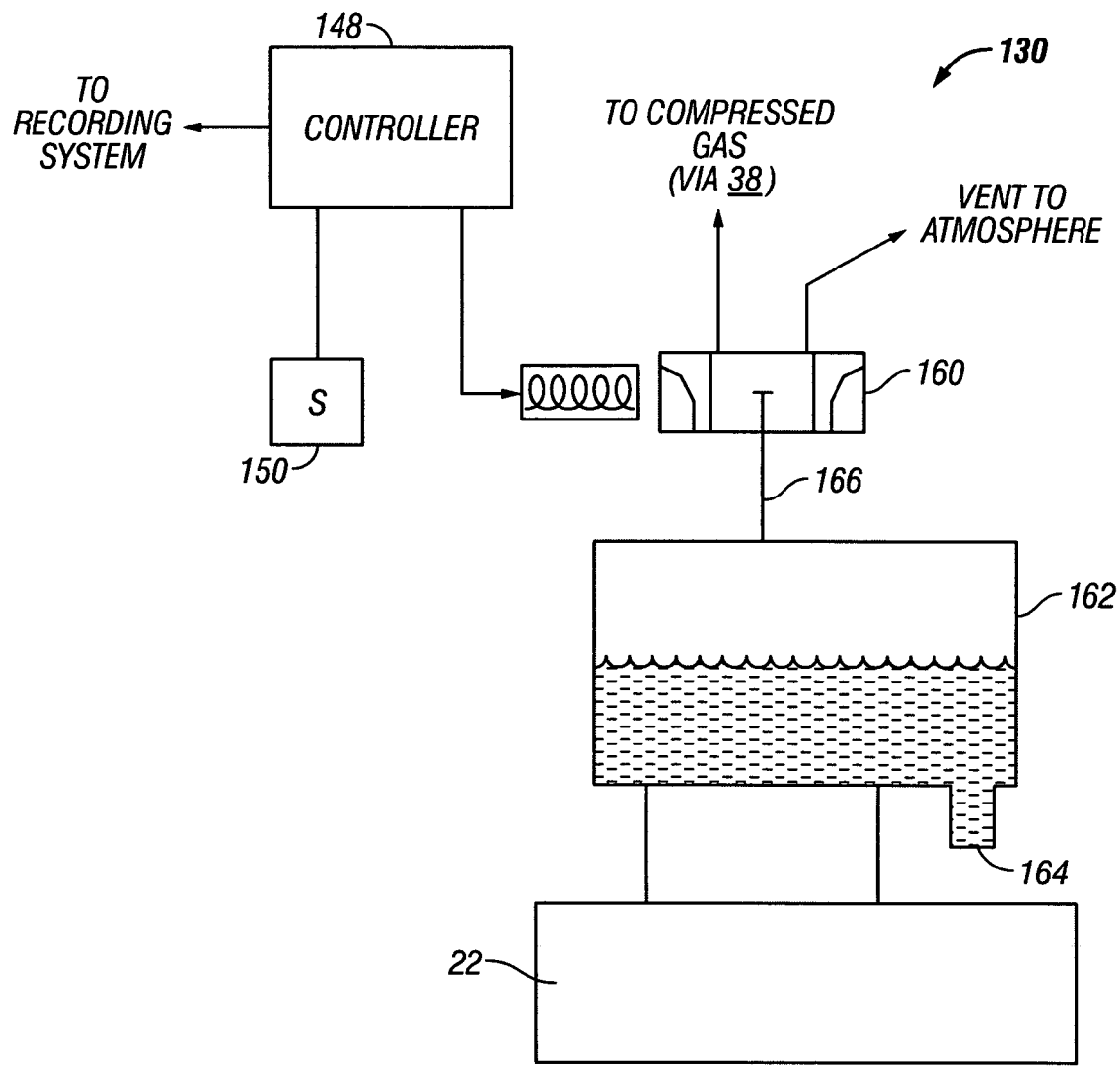
FIG. 4 shows another embodiment of a seismic source depth control mechanism.

The embodiment shown in FIG. 2 may also include, or may include in substitution of the diving planes 330A, a ballast chamber (see reservoir 162 in FIG. 4). The ballast chamber, as will be explained with reference to FIG. 4, may be selectively filled with water to change the overall buoyancy of the depth controller. Changing the buoyancy will cause the depth controller to rise or sink in the water, depending on the volume of water in the ballast chamber and the resulting overall buoyancy.

Each seismic energy source 22 may be pneumatically (or hydraulically if it is a water gun) and electrically connected to the tow cable 10. The tow cable 10 typically includes electrical conductors (not shown separately) and gas or liquid charge lines (not shown separately) to provide triggering signals and charge energy to each seismic energy source 22. Such connection between the seismic energy sources 22 and the tow cable 10 may be made by lines and cables of types well known in the art.

Depth change in the present embodiment may be effected by rotating the diving planes 330A disposed laterally on the housing 331. The depth controller of the present embodiment as a matter of operating principle affects the depth of the seismic energy source 22 in the water by selectably or controllably exerting an upward or downward force generated by movement of the water past the diving planes 330A sufficient to change the depth of the housing 331. The depth controller may also maintain the depth of the seismic energy source 22 substantially constant by neutralizing the total upward and downward forces on the housing 331.

In the present embodiment, when it is desirable to change the depth of the seismic energy sources 22, the depth controller may be operated to perform depth change by rotating the diving planes 330A. Rotation of the diving planes 330A will apply upward or downward thrust to the depth controller as the housing 331 and the associated seismic energy sources 22 are moved through the water. When the selected depth is reached, the diving planes 330A may be rotated to a neutral (substantially horizontal) position to provide essentially no upward or downward thrust, thus maintaining the depth of the depth controller and associated seismic energy sources 22.

Figure 3:
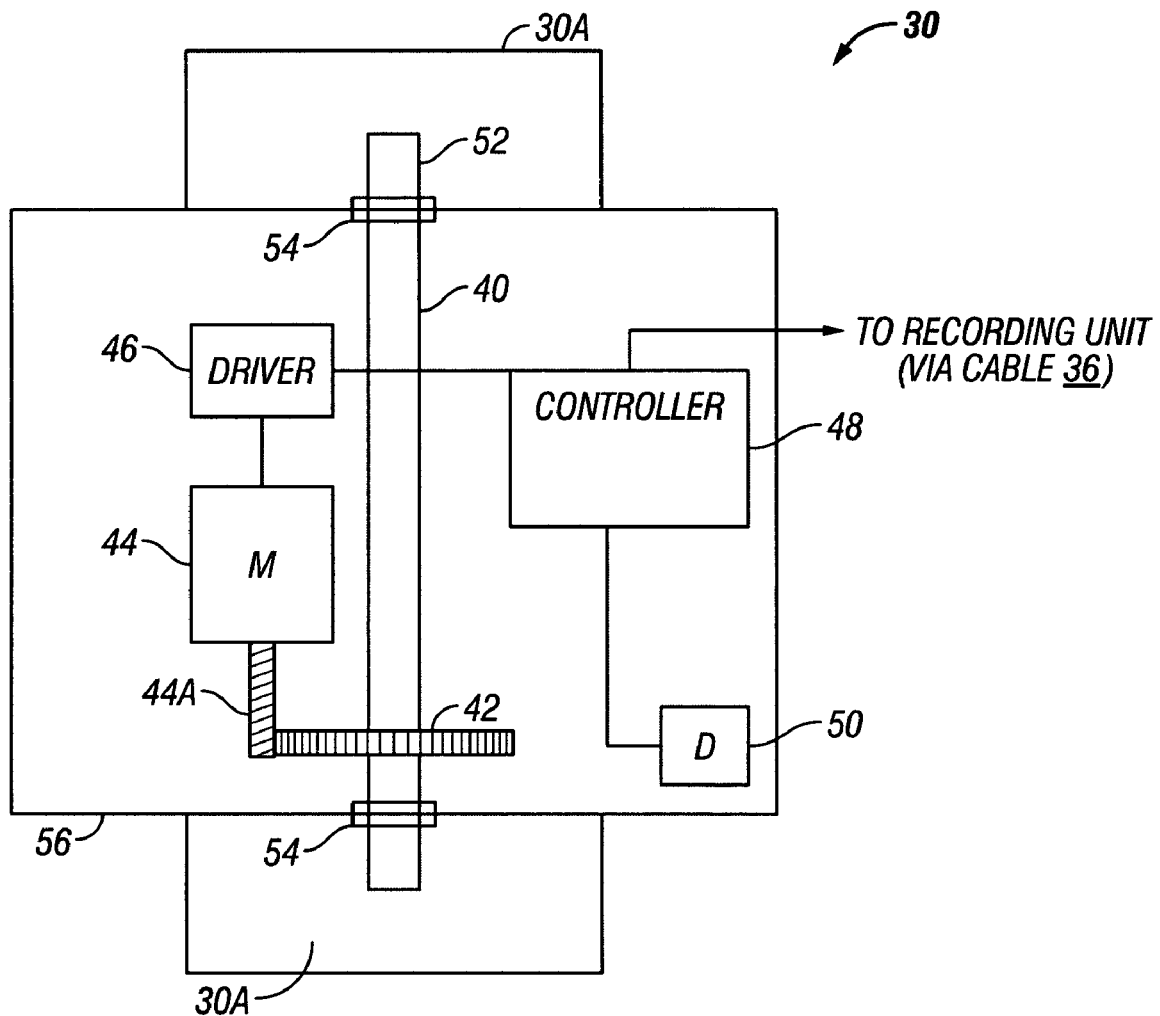
FIG. 3 shows a plan view of one embodiment of a seismic source depth control mechanism.

FIG. 3 shows a plan view of one embodiment of a device 30 for rotating the diving planes shown in FIG. 2. The device 30 may be enclosed in a sealed device housing 56 if the device is not already sealed within the chamber (56A in FIG. 2) in the controller housing (331 in FIG. 2). If a separate device housing 56 is used, the device housing 56 may be coupled to the depth controller housing (331 in FIG. 2) in any suitable manner. The device housing 56 may in some embodiments be filled with kerosene or similar liquid hydrocarbon to protect internal components of the device 30, to provide electrical insulation to such internal components, and to resist entry of water under pressure when the device 30 is operated at substantial depth in the water. Internal components of the device 30 may include a pivot shaft 40 affixed at each end thereof to one of the diving planes 30A, which may be substantially airfoil shaped and rotatable about a horizontal plane thereof to provide the previously described upward or downward thrust. The pivot shaft 40 may be rotatably mounted to the device housing 56 in sealed bearings 54. A spur gear 42 may be fixedly mounted to the pivot shaft 40. The spur gear 42 may be rotated by a combination motor 44 and worm gear 44A. The motor 44 in the present embodiment may be an electric motor, but may also be a pneumatic or hydraulic motor. By using the combination of motor 44, worm gear 44A and spur gear 42 shown in FIG. 3, the thrust force applied by the diving planes 30A will not cause counter rotation of the shaft 40, because, absent rotation of the worm gear 44A, the shaft 40 is substantially rotationally locked. The motor 44 may be operated by a motor driver 46 such as a silicon controller rectifier motor speed and direction control circuit of types well known in the art. The motor driver 46 may be itself operated by a microprocessor based system controller 48. In the present embodiment, the system controller 48 may be in signal communication with the depth sensor 50 such as a high resolution pressure sensor, such that changes in pressure detected by the depth sensor 50, indicative of changes in depth of the device 30 in the water, may be communicated to the system controller 48. The system controller 48 may be programmed in some embodiments to apply corrective thrust by operating the motor 44 to suitably rotate the diving planes 30A. Such operation in some embodiments may maintain the device 30 and the associated depth controller housing (331 in FIG. 2) at a constant, preselected depth in the water. The system controller 48 may also be in signal communication with a recording and navigation system (not shown in the Figures) onboard the seismic tow vessel (not shown) or another vessel (not shown), typically through the charge line/cable (not shown) and the tow cable (10 in FIG. 2), such that when the system operator desires to change the selected depth, a command signal may be communicated from the recording/navigation system to the system controller 48 to change the selected depth.

Another embodiment of a device to provide upward and downward depth control force to the depth controller housing (331 in FIG. 2) is shown in FIG. 4. The device 130 in the present embodiment includes a tank or reservoir 162 which has a size selected such that when the reservoir 162 is substantially filled with air or gas it provides sufficient buoyant force to lift the entire depth controller (including housing 331 and sources 22) in the water to change the operating depth of the depth controller and the seismic source(s) carried therewith. The bottom of the reservoir 162 includes an opening 164 to the water. An upper inlet line 166 to the reservoir 162 can be coupled to a three-way, solenoid operated pneumatic valve 160. In the position shown in FIG. 4, the upper inlet line 166 is in communication with a pneumatic closure, and is thus sealed. When the upper inlet line 166 is pneumatically sealed, an amount of water in the reservoir 162 is substantially maintained.

When the valve 160 is operated to be in one endmost position, the upper inlet line 166 may be pneumatically connected to a source of pressurized gas. Where the seismic source 22 is an air gun, the gas may be compressed air supplied by the charge line/cable (not shown) from equipment (not shown) generally disposed on the towing vessel (not shown). When the valve 160 is operated to pneumatically connect the inlet line 166 to the compressed gas source, the compressed gas enters the reservoir 162 and displaces the water therein through the opening 164. When the water is displaced by gas, the amount of buoyant force provided by the depth controller 130 increases, thus lifting the housing (331 in FIG. 2) in the water.

When the valve 160 is operated to the other endmost position, the upper inlet line 166 is pneumatically connected to a vent to atmosphere, as shown in FIG. 4. By pneumatically venting the reservoir 162, water will enter the opening 164, filling the reservoir 162 and reducing the buoyant force exerted by the depth controller 130. When the buoyant force drops below the in-water weight of the seismic energy source 22 and its associated components, the depth controller housing (331 in FIG. 2) will drop to greater depth in the water.

The valve 160 may be operated by a microprocessor-based system controller 148, similar to the one described for the embodiment shown in FIG. 3. The system controller 148 may be in signal communication with a depth sensor 150, which may be a pressure responsive sensor as in the embodiment of FIG. 3. Just as in the previous embodiment of FIG. 3, the system controller 148 may be programmed to operate the device 130 to cause the depth controller housing (331 in FIG. 2) to maintain a selected depth in the water, in response to the signal from the depth sensor 150. Also as in the previous embodiment, the system controller 148 may be in signal communication with the seismic recording system (not shown) whereby the system operator may change the selected depth. In the present embodiment, if the depth of the depth controller 130 becomes shallower than the selected depth, as indicated by a lower pressure signal on the depth sensor 150, the system controller 148 will operate the valve 160 to connect the upper inlet line 166 to the atmospheric vent, thus enabling water to enter the reservoir 162. Such action will cause the depth controller 130 to sink under its total weight in water. If the depth of the depth controller becomes greater than the selected depth, as indicated by a higher pressure signal from the depth sensor 150, the system controller 148 will operate the valve 160 to connect the upper inlet line 166 to the source of pressurized gas, thus displacing water from the reservoir 162 and buoyantly lifting the depth controller.

As will be appreciated by those skilled in the art, as the depth of the device 130 changes, the water pressure at the opening 164 will also change, thus affecting the actual volume of gas within the upper part of the reservoir 162, and consequently, the buoyant force exerted by the device 130. In the present embodiment, the buoyant force of the reservoir 162 may be substantially continually adjusted to maintain the selected depth, such that pressure effects on the air or gas volume need not be taken into account.

The embodiment of device 130 shown in FIG. 4, as previously explained, may be used in substitution of, or in conjunction with the device (30 in FIG. 3) used to operate the diving planes (330A in FIG. 2). Either embodiment of device may be included in a depth controller with or without an associated rudder. A seismic source associated with a depth controller according to the various aspects of the invention may be able to operate at selected depths in the water for, among other purposes, attaining a selected source "signature" (energy content with respect to frequency), and avoiding obstacles in the water.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic source, comprising:

a housing configured to be coupled at a forward end to a seismic source tow cable;

at least one seismic energy source disposed in an opening in the housing;

at least one depth control device associated with the housing;

at least one rudder rotatably coupled to the housing and configured to effect motion of the source in a direction transverse to motion effected by the at least one depth control device; and means for controlling operation of the depth control device and the at least one rudder such that the housing is movable to a selectable depth and a selected lateral position behind a tow vessel.

2. The seismic source of claim 1 wherein the at least one depth control device comprises a diving plane.

3. The seismic source of claim 1 wherein the at least one depth control device comprises a ballast chamber.

* * * * *